United States Patent [19]
Laforge et al.

[11] 3,948,299
[45] Apr. 6, 1976

[54] TREE DELIMBING APPARATUS

[76] Inventors: Leo Paul Laforge; Robert Laforge, both of R.R. No. 1, Begin, Chicoutimi County, Quebec, Canada

[22] Filed: Nov. 11, 1974

[21] Appl. No.: 522,993

[52] U.S. Cl. ............ 144/2 Z; 83/928; 144/309 AC
[51] Int. Cl.² ..................................... A01G 23/08
[58] Field of Search ........ 144/2 Z, 3 D, 34 E, 34 R, 144/309 AC; 83/928

[56] References Cited
UNITED STATES PATENTS

| | | | |
|---|---|---|---|
| 3,464,468 | 9/1969 | Thompson et al. ................. | 144/3 D |
| 3,735,788 | 5/1973 | Coughran, Jr. ................... | 144/2 Z X |
| 3,805,858 | 4/1974 | Morin ................................. | 144/2 Z |
| 3,814,151 | 6/1974 | Jouppi ............................... | 144/2 Z |

*Primary Examiner*—Donald R. Schran
*Assistant Examiner*—W. D. Bray
*Attorney, Agent, or Firm*—Raymond A. Robic; Louis Allahut; Arthur Schwartz

[57] ABSTRACT

A tree processing apparatus and more particularly an apparatus for delimbing at least two, and preferably about ten, trees simultaneously. The trees, which have been previously felled, are each loaded, by one end in the apparatus and then all the trees are substantially simultaneously moved through the apparatus while being delimbed. Means can also be provided on the apparatus to saw the trees transversely into sections.

6 Claims, 3 Drawing Figures

TREE DELIMBING APPARATUS

This invention is directed toward an apparatus for processing trees.

The invention is more particularly directed toward an apparatus for substantially mechanically delimbing trees.

Tree delimbers are well known in the art. However, all the known delimbers, to applicant's knowlege, process one tree at a time. In addition, these known delimbers usually form part of a rather expensive and complex tree harvesting machine, thus requiring a large capital outlay and frequent maintenance, which is expensive.

It is the purpose of the present invention to provide a tree processing apparatus, and more particularly, a tree delimber, which can process at least two or preferably more trees at one time. The apparatus of the present invention could process at least ten trees at one time if desired. It is also a purpose of the present invention to provide a tree processing apparatus which is relatively simple to construct and to operate. The apparatus of the present invention could be attached to, and run from, an ordinary tractor for example. The apparatus is relatively simple, and thus relatively inexpensive since it dispenses with complicated tree cutting or shearing means and tree grappling means common in the complex tree harvesting machines which machines also delimb. The trees could be manually felled, such as with a chain saw for example, and a second ordinary tractor could be used to assemble the felled trees on the processing apparatus of the present invention. With the apparatus capable of processing ten or even more trees at one time, the trees are processed nearly as quickly as with the complex tree harvesters but much more inexpensively.

The invention, in its broadest aspect, is directed toward an apparatus for processing trees which apparatus has means for receiving the ends of at least two trees, which trees are in substantially parallel relation. Means are also provided on the apparatus for each tree for delimbing the tree as they are moved through the apparatus.

More particularly, the invention is directed toward an apparatus for processing trees which apparatus has an elongate frame, and means on the frame for receiving the ends of at least two trees extending substantially transversely to the frame. The trees, when received, extend substantially parallel to one another. Means are provided on the frame for moving the trees substantially simultaneously transversely through the frame and for substantially simultaneously delimbing the trees as they are moved through the frame.

Means can also be provided on the apparatus for sawing the trees, transversely of their length, into sections.

The invention will now be described in detail having reference to the accompanying drawings in which.

Figure 1:
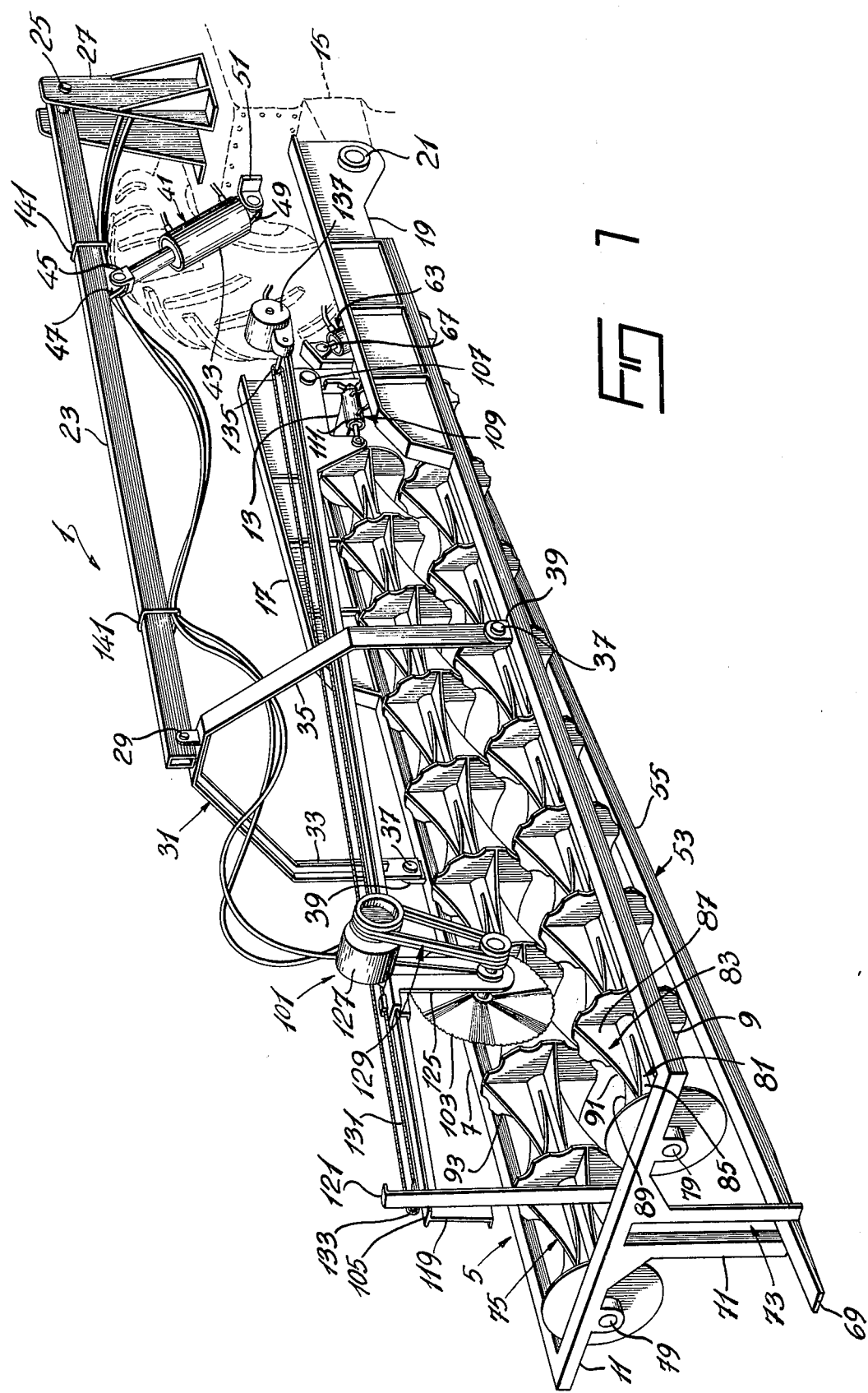
FIG. 1 is a perspective view of the tree processing apparatus.
Figure 2:
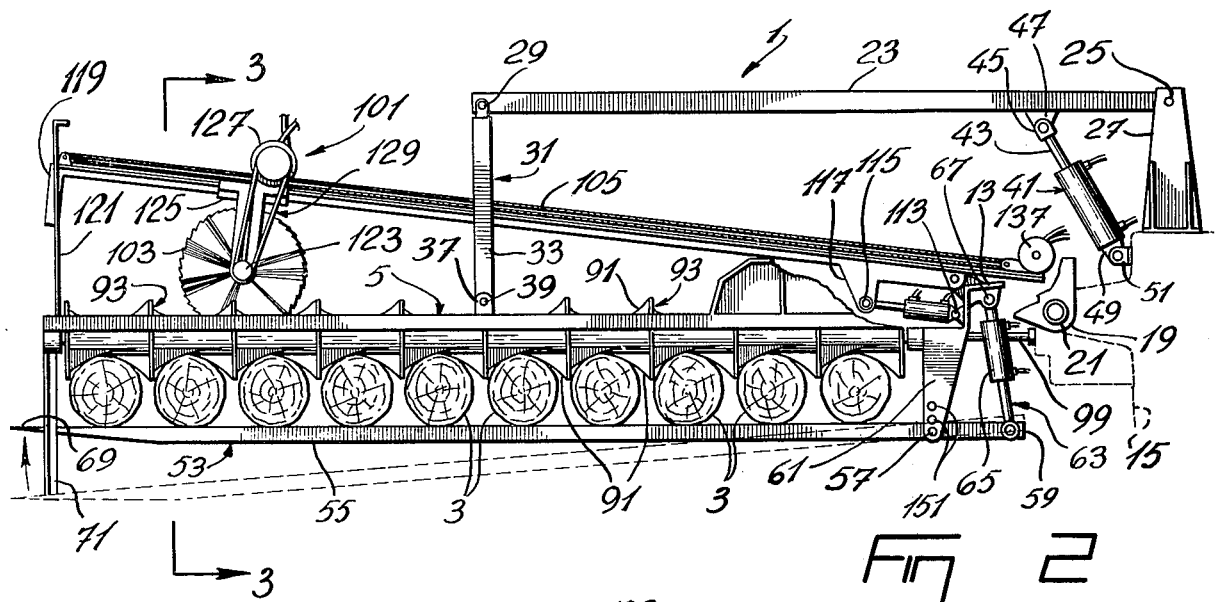
FIG. 2 is an elevation view of the apparatus, in partial cross-section.

The tree processing apparatus 1 of the present invention is constructed to process at least two trees 3 substantially simultaneously. Preferably, the apparatus can process at least ten trees 3 substantially simultaneously, as shown in FIG. 2.

The apparatus 1 includes a main elongate frame 5. The main frame 5 has a pair of parallel longitudinal side frame members, 7, 9. The main frame members 7, 9 are connected together at their ends by transverse end frame members 11, 13. The apparatus 1 is adapted to be readily connected to a tractor 15 or other similar vehicle which vehicle provides power for the apparatus. To this end, the frame 5 has a pair of brackets 17, 19 extending longitudinally from side frame members 7, 9. The brackets 17, 19 each have an aperture (not shown) at their free end by which they, and thus frame 5, are pivotably attached, by bolts 21, to tractor 15.

The frame 5 is supported from the tractor by a boom 23. The boom 23 is pivotably connected at one end by a pin 25 to a vertical bracket 27 fixed to the tractor. The other end of the boom 23 is pivotably connected by a pin 29 to a U-shaped support member 31. The arms 33, 35 of member 31 are pivotably attached by pins 37 to brackets 39 on side frame members 7, 9 respectively. The brackets 39 are located approximately midway along the length of side frame members 7, 9.

Means 41 are provided for lifting or lowering boom 23, and thus frame 5, relative to tractor 15. The lifting or lowering means 41 can comprise a hydraulic actuator 43 pivotably connected at one end 45 to a bracket 47 on boom 23. Bracket 47 is near bracket 27 but spaced therefrom. At its other end 49, actuator 43 is pivotably connected to a bracket 51 fixed on tractor 15. Operation of actuator 43 will raise or lower frame 5 about pivot pins 21.

Means 53 are provided on frame 5 for supporting the trees 3 to be processed. These means 53 preferably comprise a support member 55 mounted beneath frame 5 and extending between, beneath, and parallel to, side frame members 7, 9. The support member 55 is pivotably connected by a pin 57, near its end 59 adjacent tractor 15, to a bracket 61 depending down from end frame member 13. Member 55 is raised or lowered about pin 57 by actuator means 63. The actuator means 63 can comprise a hydraulic actuator 65 pivotably connected at one end to end 59 of support member 55 and at its other end to a bracket 67 on end frame member 13. Support member 55 is guided for vertical movement near its unsupported end 69 by a vertical guide member 71 having a guide slot 73 receiving member 55. Guide member 71 is attached to, and extends down from, end frame member 11.

Means are mounted on the frame 5 for processing, and more particularly, moving and delimbing the trees 3. The moving and delimbing means comprises a first mover and delimber 75 and a second mover and delimber 77. Both movers and delimbers 75, 77 have a cylindrical shaft 79 by which they are rotatably mounted in frame 5, extending between end frame members 11, 13. Mover and delimber 75 extends parallel to members 7, 9 and 55 and is located between members 7 and 55. Mover and delimber 77 also extends parallel to members 7, 9 and 55 and is located between members 9 and 55. Movers and delimbers 75 and 77 are each rotated in the same direction by a chain drive 78 shown in FIG. 3.

Each mover and delimber 75, 77 has a series of mover and delimber stations thereon. Each station is defined by two sets 81, 83 of delimber plates. Set 81 consists of a plurality of plates 85, preferably four in number, arranged longitudinally along shaft 79. Set 83 also consists of a plurality of plates 87, preferably four in number, arranged longitudinally along shaft 79. Plates 85 are equally spaced from each other about shaft 79 as are plates 87. The plates 85, 87 extend radially out from shaft 79. The plates 85 in set 81 are circumferentially offset from the plates 87 in set 83 and the two sets 81, 83 of plates are interleaved. Plates 85 have a slight concave edge 89 tapering down a point toward plates 87 and plates 87 also have a slight concave edge 91 tapering down to a point toward plates 85. The plates 85, 87 in each station are preferably welded onto shafts 79.

Circular plates 93 are fixedly mounted on the shafts 79 between the delimber stations. The plates 93 extend transversely to shafts 79 and plates 85, 87. Adjacent sets of plates between adjacent stations are fixed at their ends to circular plates 93 thus providing a rigid structure. The peripheral edge 95 of plates 93 preferably has notches 97 formed in it.

shafts 79 of each mover and delimber 75, 77 each have an extension 99 by which they are connected to the tractor 15 so they can be rotated when desired.

Means 101 are provided, if desired, for cutting the processed trees 3 into lengths. The cutting means 101 can comprise a circular saw 103 mounted on the frame 5. A longitudinal saw guide rail 105 is mounted above frame 5. The rail 105 preferably has a "T" cross-section. At one end, the rail 105 is attached by a pivot pin 107 to a bracket mounted on end frame member 13. Actuator means 109 are provided for raising or lowering rail 105, about pin 107, relative to frame 5. The actuator means 109 can comprise a hydraulic actuator 111 pivotably attached at one end by pin 113 to end frame member 13 below pin 107, and pivotably attached at its other end by a pin 115 to a bracket 117 depending down from rail 105. The free end 119 of rail 105 is guided for vertical movement by a vertical guide post 121 extending up from end frame member 11.

Circular saw 103, to cut the top of the trees at the end of the operation, is mounted on a horizontal stub shaft 123 which shaft 123 in turn is rotatably mounted at the bottom of a hanger member 125. Hanger member 125 is slidably mounted at the top on rail 105. Also mounted on the top of hanger member 125 is a motor 127 which, through a belt and pulley system 129, rotates shaft 123 and thus saw 103.

A drive cable 131 is attached at its ends to the top of hanger member 125. The cable 131 forms a tight loop passing over pulleys 133, 135 located at the ends of rail 105. Rear pulley 135 is driven by a motor 137 attached to the rail 105. Saw motor 127 has power lines 139 connected to it from the tractor 15. The power lines 139 are suspended from boom 23 by slidable clips 141 so that the lines 139 remain out of the way, yet permit the saw 103 to move to the free end of rail 105.

Figure 3:
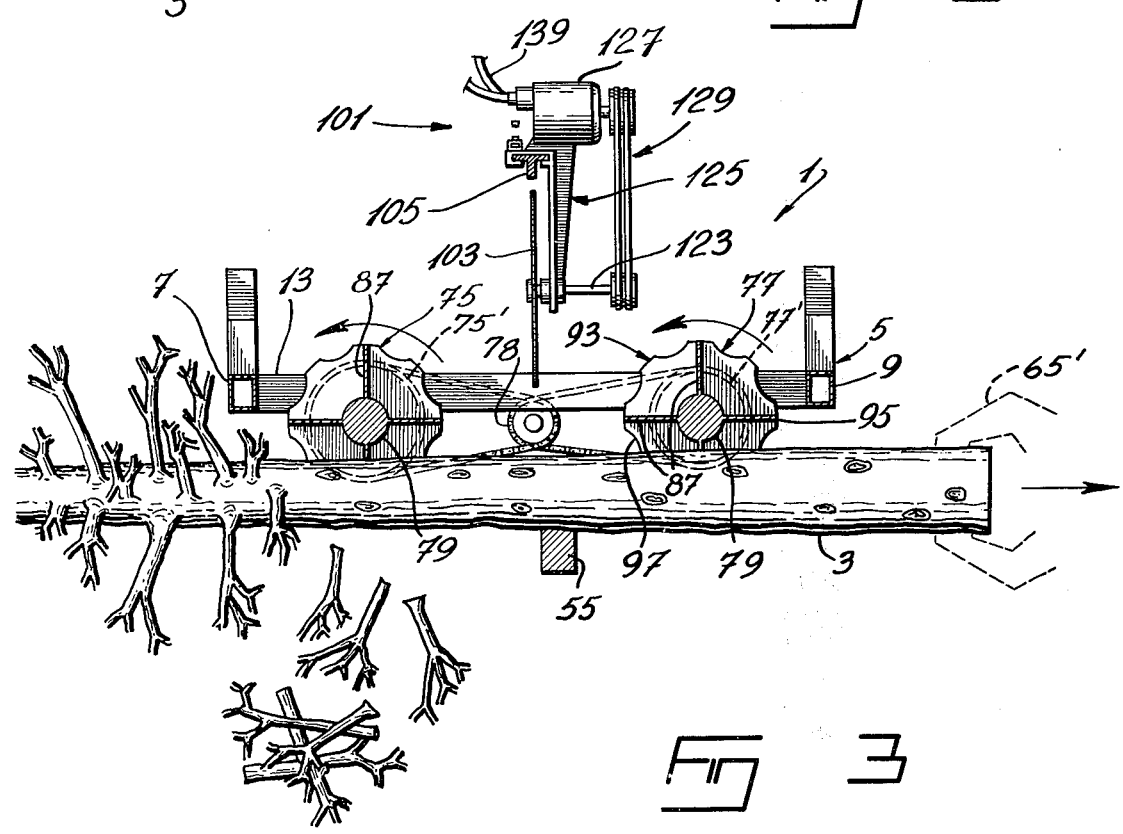
FIG. 3 is a cross-sectional view of the apparatus taken along line 3—3 in FIG. 2.

In operation, the support member 55 is lowered, about pin 57, to the dotted line position shown in FIG. 2, by actuator 65, to allow trees 3 to be placed in the apparatus by means of the jaws 65' shown in dotted lines in FIG. 3. The trees 3 are laid on top of member 55 and member 55 is then raised toward frame 5 by actuator 65 to loosely support the trees between the bottom of frame 5 and the top of member 55. The big end of the trees 3 is preferably placed in the apparatus first since the big ends are relatively free of branches. If necessary, the ends of the trees could be manually trimmed of branches to start the operation. The trees are laid in the apparatus initially to have the trees lying under both delimbers 75, 77 and on top of member 55 so as to be properly supported.

The delimbers 75, 77 are then rotated to both move and delimb the trees. The delimbers 75, 77 are rotated in a counterclockwise direction as shown by the arrows in FIG. 3. Each tree is therefore drawn from left to right by plates 85, 87 as viewed in FIG. 3 and moved through the machine. The plates 85, 87 in the stations in the first delimber 75 cut or break off the branches on a portion of each respective tree as it is moved transversely through the frame. The notches 97 in the edge 95 of the plates 93 also break off branches. Both the notches 97 and edges 91 of the plates 85, 87 also serve to pull the tree through the apparatus. The concave interleaved edges 91, and plates 93 serve to locate and guide each tree in a predetermined path through the apparatus. Generally, the first delimber 75 will remove most of the limbs off one peripheral half of the trees while the following delimber 77 will generally remove the remaining limbs. The trees move in an oscillatory movement through the apparatus, owing to the difference obtained between the rotation speeds of delimbers 75 and 77 by means of the differently sized sprocket wheels 75' and 77' as shown in FIG. 3. After the tree has passed the first delimber 75, the oscillatory movement of the tree causes the uncut limbs to move from a bottom to a top position. The uncut limbs, now generally on top, are cut or broken off by the second delimber 77.

If desired, the trees can be cut into sections by saw 103. The delimbers 75, 77 are stopped after a desired length of tree has passed through the apparatus, and saw 103 can be moved, by motor 137 and cable 131, out to the end of rail 105. Saw 103 is then operated by motor 127 and rail 105 is lowered by actuator 111 to cut through the first trees 3. With rail 105 still lowered, saw 103 is then moved toward the tractor 15 by motor 137 and cable 131 to cut through the remainder of the trees. The cut tree sections may still have a few limbs on them which could be removed manually. Member 55 is then lowered to replace the remaining sections of the trees in the proper position and then raised again to delimb further lengths.

To avoid having to manually delimb the cut sections, and reload the machine, the cutting means 103 can be located adjacent side frame member 9 so as to cut the sections after they have passed through both delimbers and while the trees remain supported so as to avoid reloading.

After the sections have been cut, the rail 105 is raised, saw 103 is moved back to the free end of rail 105, and the delimbers 75, 77 are started up again.

The apparatus can be constructed to process trees of different diameter at the same time. To this end, bracket 61 can be provided with two or more locating holes 151 located at slightly different elevations. Member 55 can then be pinned, by pin 57, in higher or lower holes so as to slant toward, or away, from frame 5 instead of being parallel to frame 5, as shown in FIG. 2, when processing trees of the same diameter. In slanting member 55 toward or away from frame 5, a wedge shaped gap is provided which can accommodate trees of different diameter.

Actuators 43, 65, 111 and motors 127, 137 are all operated from the tractor 15.

The embodiments of the invention in which an exclusive property or privilege is claimed are defined as follows:

1. Apparatus for delimbing felled trees, comprising in combination:
   a. a longitudinally elongated support member for supporting at least two trees extending substantially transversely thereto and substantially parallel to each other,
   b. a longitudinally elongated frame extending over the support member, and
   c. two parallel moving and delimbing means horizontally spaced apart from each other and rotatably mounted about a longitudinal axis on the frame, for moving the trees substantially simultaneously transversely between the support member and the frame and substantially simultaneously delimbing the same as they are moved between said support member and said frame, each of a said moving and delimbing means comprising a plurality of mover and delimber stations, each station having one set of longitudinally extending, circumferentially spaced apart blades interleaved with a second set of longitudinally extending circumferentially spaced apart blades, the blades of each set sloping down to a point toward the blades in the other set.

2. Apparatus as claimed in claim 1 including substantially circular blades extending transversely of the longitudinal blades sets, each circular blade separating adjacent stations and being attached to adjacent blades in adjacent stations.

3. Apparatus as claimed in claim 2, wherein each substantially circular blade has notches in its peripheral edge for use in cutting or breaking off limbs and in moving adjacent trees.

4. Apparatus as claimed in claim 3, wherein the support member is pivotably connected near one of its ends to the frame, and actuator means are pivotably connected between the frame and the one end of the support member for pivoting the support member relative to the frame about its pivot connection to the frame, means being provided for adjusting the elevation of the pivot connection of the support member to the frame.

5. An apparatus as claimed in claim 1 wherein sawing means are mounted on the apparatus for sawing the trees, transversely of their length, into sections.

6. An apparatus as claimed in claim 5, wherein said sawing means mounted on the frame for sawing the trees transversely of their length into sections comprise a circular saw, motor means for operating the saw, means for guiding the saw and motor means longitudinally of the frame, and means for raising or lowering the saw relative to the frame, and thus to the trees.

* * * * *